United States Patent [19]

Pirello

[11] Patent Number: 4,765,995

[45] Date of Patent: * Aug. 23, 1988

[54] TOFU CHEESE PRODUCT AND PROCESS OF PREPARATION

[76] Inventor: Robert J. Pirello, 620 Christian St., Apt. 2C, Philadelphia, Pa. 19147

[*] Notice: The portion of the term of this patent subsequent to Oct. 20, 2004 has been disclaimed.

[21] Appl. No.: 97,202

[22] Filed: Sep. 16, 1987

Related U.S. Application Data

[63] Continuation-in-part of Ser. No. 798,566, Nov. 15, 1985, Pat. No. 4,701,332.

[51] Int. Cl.$^4$ .............................................. A23C 20/02
[52] U.S. Cl. ..................................... 426/46; 426/302; 426/564; 426/582; 426/656
[58] Field of Search ................. 426/46, 302, 582, 570, 426/634, 656, 564

[56] References Cited

U.S. PATENT DOCUMENTS

| | | | |
|---|---|---|---|
| 3,743,516 | 7/1973 | Lundstedt et al. | 426/582 X |
| 3,944,676 | 3/1976 | Fridman et al. | 426/582 X |
| 3,982,025 | 9/1976 | Hashimoto et al. | 426/634 X |
| 4,144,358 | 3/1979 | Kudo et al. | 426/582 |
| 4,579,749 | 4/1986 | Ishizuka et al. | 426/634 X |
| 4,678,676 | 7/1987 | Ishizuka et al. | 426/582 X |

FOREIGN PATENT DOCUMENTS

| | | | |
|---|---|---|---|
| 3401342 | 7/1985 | Fed. Rep. of Germany | 426/582 |
| 0006840 | 1/1984 | Japan | 426/582 |
| 0071642 | 4/1984 | Japan | 426/582 |

*Primary Examiner*—Arthur L. Corbin
*Attorney, Agent, or Firm*—Dilworth, Paxson, Kalish & Kauffman

[57] ABSTRACT

A whipped low fat and low cholesterol tofu product which comprises a soft, creamy, water separation resistant tofu spread having a substantially creamy texture is described together with a method of manufacturing a soy bean curd with such qualities from a firm relatively non-porous tofu brick by coating the brick with a thin mellow white miso coating, fermenting the coated brick, removing miso from said brick, steaming said brick, and thereafter whipping said brick to form a creamy texture.

15 Claims, No Drawings

TOFU CHEESE PRODUCT AND PROCESS OF PREPARATION

This application is a continuation-in-part of application Ser. No. 798,566, filed Nov. 15, 1985, now U.S. Pat. 4,701,332.

BACKGROUND OF THE INVENTION

1. Field of the Invention

The present invention relates to a tart, soft, creamy, and water separation resistant tofu cheese product and to a method of manufacturing same.

2. Information Disclosure and Summary of the Present Invention

While a soy bean curd called tofu has been well known for some time, it is believed that prior to the present invention there has been no natural, organic tofu cheese product resistant to water separation having an extended shelf life and yet having a soft, creamy texture. As used herein a tofu spread is natural if it is derived from soy beans substantially without the addition of other substances. In the prior art, various substances such as lactic acid, vinegar, alcohols and edible oils are added during production of tofu cheese to coagulate, sterilize or otherwise modify the properties of the product; such added substances, in any substantial or effective amount, render the product non-natural.

In recent years, soy bean curd has been recognized as a high quality protein which has been disclosed as useful, for example, for making seasonings or prepared foods including spreads and the like. The prior art appears to be directed to special processes and agents used in the formation of the actual tofu from soy beans. More particularly, it relates to the manner of obtaining and treating the curd during the initial formation of the tofu.

In U.S. Pat. No. 4,460,613 a soy based cheese food is described in which the soy protein slurry, after being heated to a temperature of at least about 200° F,. is retained under positive pressure. Then the slurry is cooled and mixed with an edible oil to improve the whiteness of the product.

In U.S. Pat. No. 4,537,789 the rate of rise of temperature at the center of a raw material for tofu is adjusted to within a specific range together with the pressure to obtain a tofu which is purported to be smooth and has a compact texture free from pores and syneresis.

In U.S. Pat. No. 4,511,588 a preservable, granular, particulate tofu which is smooth and does not liberate water during storage is prepared by coagulating soy bean milk or soy bean protein paste in heated oil at specified temperatures, the concentration of soy bean milk being higher than that conventionally used in ordinary tofu. Additionally, the pH of the paste is elevated and egg white is added to coagulate the soy bean milk.

In U.S. Pat. No. 4,303,678 a long shelf life packaged soy bean curd is disclosed as being produced without the inclusion of any artificial additives such as coagulating agents and the like wherein soy bean juice is subjected to lactic acid fermentation until it reaches a specified pH whereupon the soy bean juice is subjected to heating to adjust the curd tension.

One of the many advantages of the present invention is that a novel tofu product can be manufactured using basically a standard tofu product by adopting the novel processing steps subsequent to the formation of the curd from the soy bean slurry without requiring or utilizing various additives, pressurized systems, heated oils or the like.

It is an object of the present invention to produce a novel, non-dairy tofu cheese product having major health benefits including the production of a product entirely from natural and organic ingredients which does not require any artificial additives, and yet has a novel creamy (rather than grainy) consistency while retaining beneficial characteristics such as low fat, low sodium, and no cholesterol or lactose.

Another object of the present invention is to produce a cream cheese substitute having the aforementioned attributes, further characterized in that it has a novel tart taste which is similar to that of boursin cheese and has a unique texture which makes the product a novel entry into the natural/health foods market place.

Yet another object of the present invention is to create such a unique product utilizing a generally standard recipe for the initial processing of tofu from soy beans and then treating it using natural means without resorting to either expensive complicated processes or systems or both.

Still yet a further object of the present invention is to produce a relatively non-porous integral tofu brick by virtue of control of moisture content and by incorporating novel tofu pressing and cooling techniques.

Yet another object of the present invention is to treat the firm integral tofu brick by coating it with a natural miso coating and then naturally fermenting the brick to produce a smooth and compact texture which is relatively free from pores and syneresis.

Yet a further object of the present invention is to treat the fermented brick in a manner which produces a soft and cream textured, low sodium tofu product.

Yet a further object is to provide a useful product including the miso by product of the fermentation process.

Another object of the invention is to provide a tofu cheese product of the sort therein described using only mechanical, thermal, and biological processes.

Other objects will be understood by those skilled in the art upon reading the specification herein including the detailed description of the preferred embodiment and the claims.

DETAILED DESCRIPTION OF THE PREFERRED EMBODIMENT

In producing the novel product of the present invention it is desirable that organically grown soy beans be stored and transported under controlled conditions at about 35° F. The soy beans are cooked as is known in the art in open kettles where the whey is separated from the curd which is then pressed using, a ratchet tofu press as is known in the art.

The present invention, however, requires the formation of a firm tofu brick having a substantially lower than normal moisture to solid content. Whereas a standard tofu brick may be formed using a ratchet tofu press by pressing it from between 10 and 20 minutes, it is highly desirable in forming the firm brick utilized in the present invention that the whey be drained off for about 20 minutes, resulting in more solids remaining, prior to pressing for about 45 minutes. In forming the firm brick for use in the present invention the moisture content of the tofu brick is reduced to no more than about 75% moisture, the bricks may be about 8"—8"×2½" in size. The tofu bricks have an average platelet count (APC) of not more than 100m and yeast and mold counts of less than 10.

The curd or tofu is removed from the cooked soy bean slurry and then pressed as above mentioned, then cooled in a controlled fresh water bath of constantly flowing filtered water, controlled at a temperature of less than about 40° F., the preferred temperature being about 35° F. The tofu bricks desirably are treated in such a manner for at least about 72 hours, and more preferably are soaked in the water bath between about 80 and 110 hours. It has been found that the resultant brick from the ratchet tofu pressing operation will become even more dense in the controller fresh water. That density is critical to the formation of the smooth and compact texture of the resultant bathed brick and is critical to the formation of the creamy textured whipped tofu product.

After being treated in the controlled fresh water the tofu bricks may be stored for further procesing under refrigerated conditions, preferably about 35° F., and maintained in buckets of fresh water. In the preferred embodiment the tofu bricks are removed from the temperature controlled water filled receptacles as soon as further processing is feasible.

Thereafter, the bricks are then coated with unpasteurized mellow white miso, made especially for said product containing a salt content of not less than about 9% nor more than about 12% and an APC of not more than about 4,000. Miso is a paste like substance made from fermented soybeans, cultured rice (known as koji in the art), sea salt, and water. It has been found that the use of mellow white miso (a young miso aged for 30 days) produces the desired product with the desired sodium level for preservation while maintaining a low sodium content in the finished product. Older misos have been found to produce too strong a salt taste and too high a sodium content in the finished cheese product. The tofu bricks are uniformly coated on all sides, preferably with a coating about ¼" thick for bricks of the size above mentioned. Thicker coatings create a product having a higher sodium content and therefore the coating thickness must be controlled to control the sodium content of the end product.

The coated tofu bricks are then wrapped, for instance in cheese cloth, placed on shelves, and set aside to ferment during an aging step. The temperature during fermentation is desirably maintained between about 53° F. and 58° F. In the preferred process set forth herein above, the salt content of the miso, which extracts water from the brick, dehydrates about 8% of the moisutre from the tofu bricks while about 9%–12% of the sodium from the miso coating migrates into the brick. The interaction of the enzymes of the unpasteurized miso and the protein molecule of the tofu during the fermentation step is responsible for the transformation of the grainy tofu texture into a smooth creamier texture. It has been found that the protein molecule change is similar to that which occurs when an egg is hardboiled. The difference in this preferred embodiment is that the molecular change is caused by fermentation, not heat.

It is highly preferred that the fermentation process take place in environmentally controlled conditions of no less than 53° F. nor more than 58° F. and in the absence of relative humidity. It has been found that it relatively cooler temperatures than those previously mentioned, with low relative humidity that the fermentation process is inhibited and will not produce an end product having the desired properties to a satisfactory degree. There is a tradeoff in the process between the extent of enzymatic change during the fermentation step and the sodium content of the end product, with longer times yielding greater change but also, undesirably, greater sodium content. It has been fund that a fermentation time, at a controlled temperature of not less than about 53° F. nor more than about 58° F., of about 5 days yields a brick which is aceptably fermented while having an acceptably low sodium content.

After the fermentation process, the miso is substantially removed, generally leaving a residue of the miso on the tofu brick. It has been found that, when following the preferred process, the miso removed from the brick has an APC of not more than about 70,000, yeast of about 300, and mold of about 2300; the brick surface has an APC of about 520,000, yeast of about 110, and mold of about 180; and the brick sub-surface has an APC of about 500,000 with yeast and mold of less than about 10.

Upon removal of the miso coating the tofu bricks are returned to their racks and put into a steam cabinet. Said bricks are steamed at a temperature to yield sufficiently low APC, mold, and yeast counts. Steaming bricks made according to the preferred method at a temperature of about 232° F. for about 30 minutes is preferred, resulting in APC, mold, and yeast of less than 10 and pH of 5.3.

The tofu bricks are then whipped with preferably about 2 tablespoons of spray-dried tofu powder per pound of tofu cheese (or 8 tablespoons per brick) to produce a soft spread. Whipping for about 90 seconds produces a soft creamy textured spread; addition of the preferred amount of tofu powder results in reduction of moisture from about 67% to about 65% and pH from about 5.3 to about 4.4. The whipped tofu cheese product is transferred to an automated filling machine and metered into 8 ounce containers. In whipping the tofu bricks, care must be taken to substantially keep intact the protein structure obtained during fermentation which insures the production and maintenance of the texture of the end product while retaining the water separation resistant characteristics. Whipping the tofu bricks substantially in excess of said time or at too high a shear rate would cause undesirable water separation in the whipped product. The whipped product must be maintained under controlled conditions, desirably from about 34° F. to about 38° F.

Organically grown soy beans kept under controlled refrigerated conditions and processed as described hereinbefore produce a fresher bean, which also contributes to the substantially creamy texture of the tofu of the present invention. The aforementioned process produces a whipped tofu product having a fat content of 2.5g per ounce and no cholesterol and is a water separation resistant tofu spread having a substantially soft, creamy, cream cheese like texture and a tart, boursin like taste. The fat content of the finished product is entirely due to the fat content of the beans with which the process is started. The finished whipped tofu product produced by the preferred method has a moisture content of not more than 64%.

It has been further discovered that the miso coating removed from the aged tofu bricks has substantial use. In particular, the miso may comprise a substantial portion of a novel salad dressing. The attributes of the miso coating render such dressing tasteful, healthful, and shelf-stable without addition of ordinary chemical preservatives or pasteurization. Such use of the miso coating also reduces waste and pollution in the tofu cheese manufacturing process.

In a preferred embodiment, the dressing comprises about eight parts of such miso to two parts vinegar, two parts oil, and one part water. In a particularly preferred embodiment, to the foregoing one part of rice syrup, a sweetener, is added, which modifies the taste imparted by the vinegar. Other flavorings, such as herbs, may be added. The mixed ingredients may be hot-packed in bottles at about 190° F.

The properties of the fermented miso, including its pH, result in a dressing having a substantial shelf life at room temperature without chemical preservatives or pasteurization. The pH of the composition of the preferred embodiment is about 4.0.

While the invention has hereinbefore been described with reference to a preferred embodiment, it should be understood that further modifications or variations may be made by those skilled in the art without departing from the spirit and scope of the invention including that which is defined by the appended claims. In particular, it should be understood that various flavoring materials may be added to the natural tofu spread described herein. If such flavorings are also natural, an entirely natural flavored tofu spread will result, having the desirable properties herein described. Moreover, it should be noted that while various parameters and mechanical and chemical reactions are stated as being believed to produce the desired end result, it may be possible to obtain a creamy textured product by using variations of the preferred parameters as hereinbefore set forth.

What is claimed is:

1. A process for the preparation of a creamy tofu cheese from a firm tofu brick comprising coating said frim brick with a mellow white miso coating, aging said coated brick for a time sufficient to ferment said brick and produce smooth creamy and texture, removing said miso from said aged brick, steaming said aged brick, and then whipping said steamed brick until a creamy texture is achieved, whereby a soft creamy water separation resistance tofu cheese is formed.

2. A process as in claim 1, wherein said aging step further comprises maintaining said coated bricks in a controlled environment wherein the temperature is between about 53° F. and about 58° F.

3. A process as in claim 2, wherein said aging process is carried out for about 5 days.

4. A process as in claim 2 wherein said aging step occurs in the substantial absence of relative humidity.

5. The product of the process of claim 2.

6. A process as in claim 1, wherein said aged brick is steamed at a temperature of about 232° F. for about thirty minutes.

7. A process as in claim 1, further comprising the step of soaking a pressed tofu brick in a controlled fresh water bath at a temperature of no more than about 35° F., whereby said density of said brick is increased, to form said firm tofu brick.

8. A process as in claim 7, wherein said tofu brick is soaked in said cooling fresh water bath for between about 80 and 110 hours.

9. The product of the process of claim 8.

10. A process as in claim 1, wherein tofu is pressed into a brick having a moisture content of no more than about 75% and then immediately soaked in a cooling fresh water bath at a temperature of no more than about 35° F. for at least about 72 hours to form said firm tofu brick.

11. The product of the process of claim 1.

12. A process for the preparation of a soft, creamy, water separation resistant tofu cheese from soy bean curd comprising:
    pressing said soy bean curd into a firm brick having a moisture content of no more than about 75%;
    soaking said brick in a cooling fresh water bath at a temperature of no more than about 35° F. for about 80 to 100 hours;
    coating said brick with a mellow white miso to form a coated brick;
    aging said coated brick in environmentally controlled conditions of no less than 53° F. nor more than 58° F. and in the substantial absence of relative humidity for a time sufficient to ferment said brick and produce a smooth creamy texture;
    substantially removing said miso from said aged brick;
    steaming said aged tofu brick; and then
    whipping the steamed brick into a soft creamy cheese textured product.

13. The whipped tofu product of the process of claim 12.

14. A whipped tofu product as in claim 13 wherein said moisture content is no more than about 64%.

15. A whipped tofu product as in claim 13 wherein said tofu product does not contain any dairy additives.

* * * * *